May 10, 1932.  E. L. FONSECA  1,857,187
THERMOSTATIC CONTROL MECHANISM
Filed Aug. 6, 1929   2 Sheets-Sheet 1
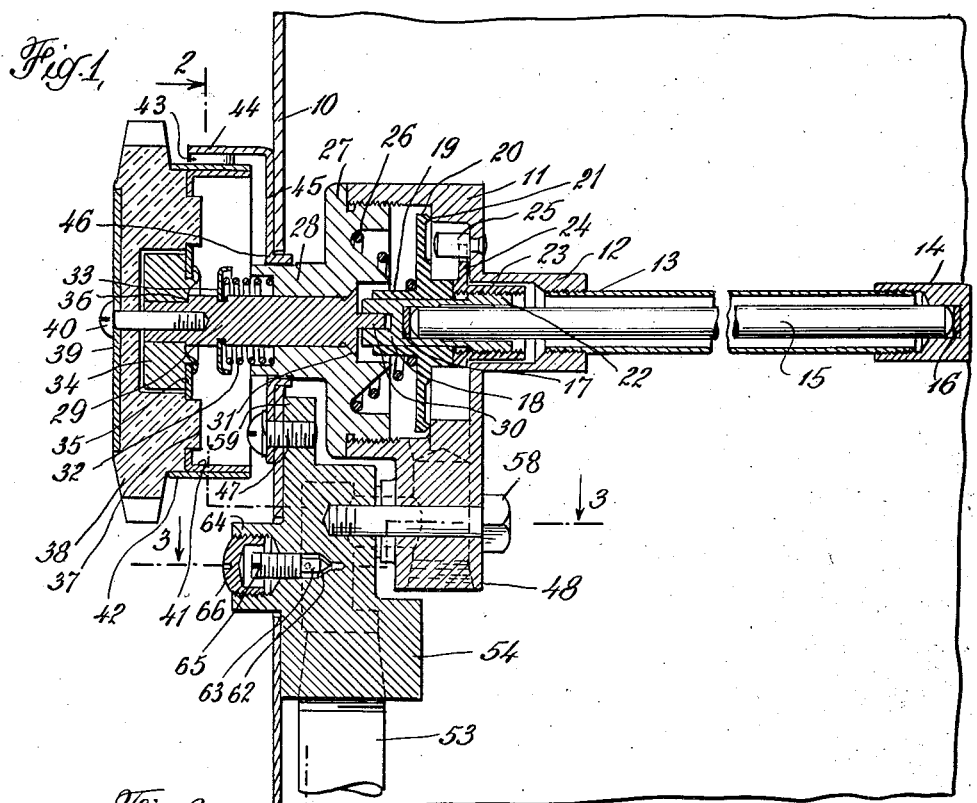
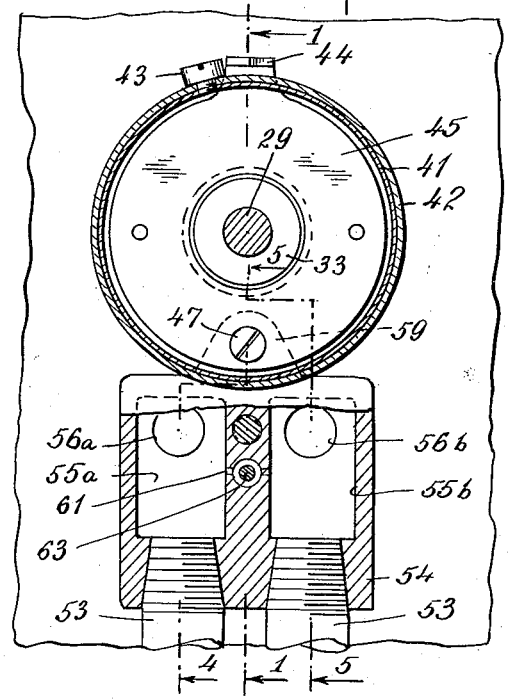
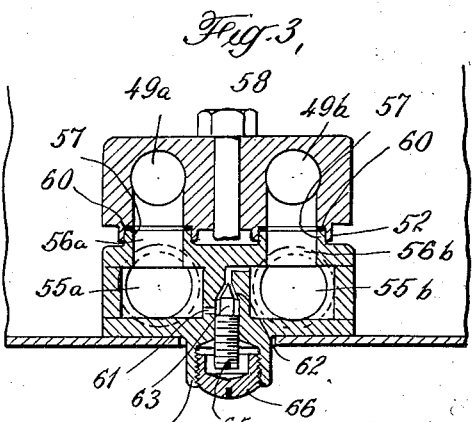
INVENTOR
Edward L. Fonseca
BY
ATTORNEYS May 10, 1932.  E. L. FONSECA  1,857,187
THERMOSTATIC CONTROL MECHANISM
Filed Aug. 6, 1929    2 Sheets-Sheet 2
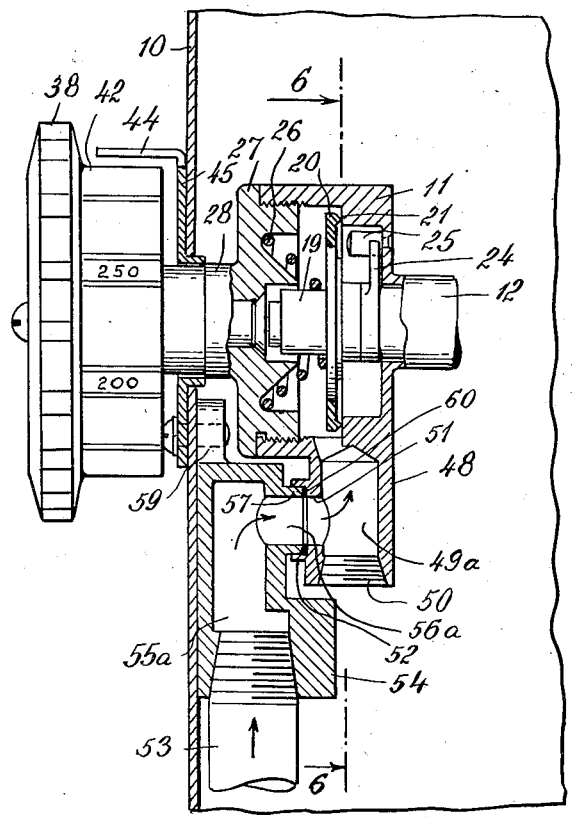
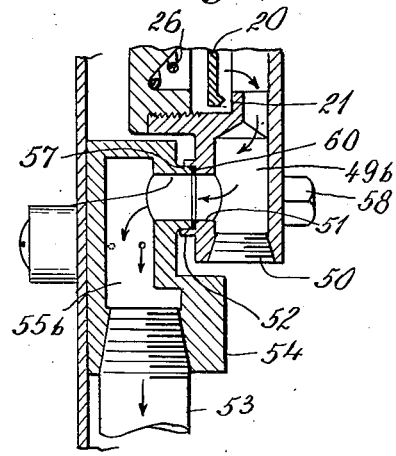
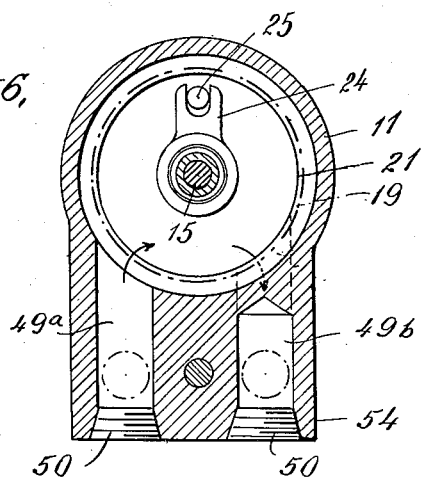
INVENTOR
Edward L. Fonseca
BY
Pennie, Davis, Marvin Edmonds
ATTORNEYS Patented May 10, 1932

1,857,187

UNITED STATES PATENT OFFICE

EDWARD L. FONSECA, OF NEWARK, NEW JERSEY, ASSIGNOR TO THE WILCOLATOR COMPANY, OF NEWARK, NEW JERSEY, A CORPORATION OF DELAWARE

THERMOSTATIC CONTROL MECHANISM

Application filed August 6, 1929. Serial No. 383,804.

This invention relates to thermostatic controllers adapted particularly for controlling the temperature within the oven of a gas stove.

In such thermostatic controllers as initially exploited in this country, the casing for the thermostatically-actuated control valve of the instrument was a large, expensive, and unsightly element of the structure mounted on the outside of the oven and considerable exposed piping was required to make the connections for leading fuel to and from the casing. In my early work in this art, the unsightliness of such structures and of the accessories used for their installation seemed to me to be highly objectionable, and I appreciated the possibility of disposing a substantial portion of the thermostatic mechanism within the oven between the inner and outer oven walls. Instruments of this type developed by me have been on the market for some time under the name of "Wilcolators" and have become widely known as thermostatic devices of the concealed type.

The instruments above referred to included a thermostatic element in the form of a bimetallic strip and following the commercial exploitation of such concealed type regulators, designers of similar instruments in which the thermostatic element takes the form of a rod and tube endeavored to construct their controllers in such manner as to derive the advantages offered by the concealed type of instrument. Such efforts have met with but limited success, since in some of these controllers, that portion of the mechanism in open view on the outside oven wall includes not only the usual regulating handle but also a valve casing of substantial size, while in others, although the valve casing is concealed, it is impossible to remove the casing and thermostatic element without first removing the fuel pipes to which the casing is directly attached.

The present invention relates to an improved form of a thermostatic controller of the rod and tube type wherein all of the advantages of the concealed type of instrument employing a thermostatic strip are attained. In this new controller the only part of the mechanism of substantial size which is on the outside of the oven wall is the operating handle by which adjustment to the desired temperature is secured. The casing for the regulating valve is inside the oven wall as are also the pipes by which the fuel is carried to and from the casing on opposite sides of the valve. With this construction all of the advantages of ready removability of the thermostatic element, and maintenance of fixed adjustment thereof and of the by-pass customarily employed in such instruments, are afforded.

In order to remove the thermostatic element of the new device, a single screw which holds the handle of the instrument in place is withdrawn and a single screw within the oven which maintains the casing in place is withdrawn, whereupon all of the parts of the instrument proper may be detached from the oven wall and removed through the oven door.

For a better understanding of the invention, reference may be had to the accompanying drawings, in which Fig. 1 is a sectional view of the improved instrument installed in an oven, the section being on the line 1—1 of Fig. 2;

Fig. 2 is a sectional view on the line 2—2 of Fig. 1;

Fig. 3 is a sectional view on the line 3—3 of Fig. 1;

Figs. 4 and 5 are sectional views on the lines 4—4 and 5—5 of Fig. 2, and

Fig. 6 is a sectional view on the line 6—6 of Fig. 4.

The controller is illustrated as mounted on the wall 10 of an oven and the instrument includes many features of construction set forth and described in my co-pending application Serial No. 322,110, filed November 27, 1928, although it is to be understood that other types of control valve and thermostatic operating means therefor may be substituted for those shown in the prior application.

Disposed inside the oven is a cup-shaped casing member 11 provided with a boss 12. Mounted in the open end of this boss is a tube 13 of expansible material closed at its outer end by a cap 14. Within the tube is a rod 15 of relatively non-expansible material, this rod bearing at its outer end against a disc 16 in the cap 14, which disc provides a bearing surface. The rod extends through the boss into the interior of the casing member 11 and bears at its forward end against a disc 17 in an abutment block 18. This block extends through an opening in the boss 19 of a disc valve 20, which valve has a circumferential knife edge bearing against a seat 21 formed in the interior of the member 11. One end of the abutment block is provided with screw threads, indicated at 22, and threaded thereon is an adjustment piece 23 provided with a forked extension 24 which straddles a pin 25 extending inwardly from one wall of the casing member 11. The valve 20 is freely movable on the abutment member 18 and is held with its boss in engagement with one end of the adjustment piece by means of a spring 26 bearing against one face of the boss and also against a cover 27 threaded into the member 11 and closing the open end thereof. The cover 27 has a hollow boss 28 extending through a suitable opening in the oven wall, this boss providing a mounting for an adjustment rod 29, having at its inner end a key 30 which fits in a slot in the end of the abutment block 18. The inner wall of the boss is tapered to form a seat 31 for a tapered flange on the inner end of the rod 29 and the flange is held in engagement with the seat by a spring 32 which surrounds the rod and bears at one end against the recessed end of the boss 28 and at the other against a plate 33 mounted in a circumferential channel in the rod 29.

On the outer end of the rod 29 is a block 34 carrying a disc 35, the block bearing against a shoulder 36 on the rod. The disc 35 is provided with a pair of openings in which are received lugs 37 on a disc 38 of insulating material, this disc being held in position by means of a washer 39 held in place by a screw 40 which enters the end of the rod 29. The disc 35 is provided with a circumferential flange 41 on which is mounted a band 42 carrying a temperature scale, and the band is provided with a stop 43 which is adapted to engage a pointer 44 on a disc 45. This disc has a central opening defined by a flange 46 and it is mounted on the outer wall of the oven by means of a screw 47 with its flange 46 entering the opening in the oven wall and with the boss 28 on the cover 29 extending through the opening in the disc.

With this arrangement, rotation of the disc 38 results in the rod 29 being turned and through the slot and key connection, the abutment block is similarly moved. The abutment block is threaded in or out of the adjustment piece 34 which is prevented from rotating with the abutment by means of the forked extension 24 and pin 25. Rotational movement of the abutment block causes a longitudinal movement of the adjustment piece 33 and a movement of the valve 20 with reference to the end of the rod 15. The greater the movement of the valve in a direction away from the end of the rod, the greater expansion of the tube 13 required before the valve will be seated by its spring 26; that is, the higher the temperature that will be developed in the oven before the valve closes to shut off the supply of fuel.

Projecting downwardly from the casing member 11 is an extension 48 in which are formed separate passages 49a, 49b, the lower ends of the passages being closed by plugs 50. One of said passages 49a leads to the casing at the outer side of the valve (Fig. 4), while the other passage 49b leads to the casing on the inner side of the valve. Openings 51 are formed in the front face of the extension to communicate with the passages 49a and 49b and the extension is provided with flanges 52 around each opening 51.

The fuel pipes 53 conducting fuel to and from the control mechanism are mounted inside the oven wall and threaded into the lower wall of a fitting 54. This fitting is in the form of a block having separate passages 55a and 55b therethrough and each pipe is in communication with one of the passages 55a, 55b, respectively. Through one face of the fitting, extend passages 56a, 56b leading to passages 55a, 55b respectively, each passage 56a, 56b being in part defined by a flange 57 which is receivable into a flange 52 on the extension 48. The fitting and extension are secured together by means of a bolt or cap screw 58 which passes through an opening in the extension and is threaded into the wall of the fitting between passages 56a and 56b. This cap screw is accessible from the interior of the oven. The fitting is provided at its upper end with a lug 59, into which is threaded the screw 47 which passes through the disc 45, the oven wall, and into the lug. Packing washers 60 are provided between the ends of the flanges 57 and their seats 52 in order to make the connections gas tight.

In order to provide a by-pass around the valve, a passage 61 is formed in the fitting 54 to connect the passages 55a and 55b. This passage has portions at right angles to each other and in one of said portions is formed a valve seat 62 against which bears the end of a valve 63 threaded into an opening in the wall of the fitting. The fitting is provided with a flange 64 spaced from the projecting end 65 of the valve stem, and a cap 66 is threaded into the flange to protect the end of the valve stem and prevent tampering therewith. The flange 64 extends through an opening in the oven wall so that the valve is accessible from outside the oven for adjustment.

It will be seen that in the arrangement described, the entire thermostatic control mechanism is wholly concealed with the exception of the operating handle with its temperature scale and pointer, and the control valve for the by-pass. The piping passes into the oven from beneath and runs up inside the oven wall to the fitting which is permanently attached to the inner face of the oven wall. The control casing for the regulator valve is detachably mounted inside the oven and is wholly concealed.

This construction has numerous advantages in that it makes the gas stove much more sightly and reduces the cost of the apparatus, since in a device in which the valve casing and pipes are exposed these parts must be given a high finish and are ordinarily nickel plated. In the present device, the valve casing, fittings, and pipe are all out of sight and, therefore, need not be given the high degree of machining, which would otherwise be necessary, and need not be finished with special plating. In installing the device, the piping is threaded into the fitting and the latter is mounted in place against the inner wall of the oven. The disc 45 is then placed in position and the screw 47 turned in to hold the disc and fitting tightly against the oven wall. The control casing with the thermostatic element attached is then inserted into the oven through the oven door, placed in position against the fitting, and the cap screw 58 is then threaded in place to hold the casing tightly against the fitting and make gas-tight connections between the two.

In placing the valve casing in position, the boss 28 on the cover of the casing and the adjusting rod are passed through the openings in the oven wall and disc 45, and the adjusting handle and its associated parts mounted in place on the outer end of the rod by means of the screw 40. The installation is now complete and ready for operation, the valve mechanism having been calibrated before being installed. If for any reason it is necessary to remove the valve casing and thermostatic device, this is readily done simply by removing the screw 40 and taking off the handle, and thereafter unscrewing the cap screw 58, whereupon the valve casing and thermostatic element may be removed bodily as a unit through the interior of the oven. This removability of the valve casing and thermostatic element does not disturb the piping installation or the fitting 54, the latter elements remaining in place ready to have the casing re-connected thereto in the manner described.

What I claim is:

1. A fuel controller for use on a gas stove having an oven which comprises temperature-responsive means, fuel pipes, a fitting to which said pipes lead, and a casing containing a valve actuated by said means, said means, pipes, fitting and casing being disposed inside the oven, and said casing being removable while said pipes and fitting remain in position.

2. A fuel controller for use on a gas stove having an oven which comprises temperature-responsive means, fuel pipes, a fitting to which said pipes are connected, and a valve casing containing a valve actuated by said means, said casing being detachably connected to said fitting, and said means, pipes, fitting and casing being concealed inside the oven.

3. A fuel controller for use on a gas stove having an oven which comprises temperature-responsive means and fuel pipes within said oven, a fitting to which said pipes lead, and means within said oven actuated by said first means and controlling the flow of fuel through said pipes, both said means being removable while said pipes and fitting remain in position.

4. A fuel controller for use on a gas stove having an oven which comprises temperature-responsive means and fuel pipes within said oven, a fitting to which said pipes lead, and means within said oven actuated by said first means and controlling the flow of fuel through said pipes, said control means being detachably connected to said fitting.

5. A fuel controller for use on a gas stove having an oven which comprises temperature-responsive means and fuel pipes within said oven, a fitting to which said pipes lead, means within said oven actuated by said first means and controlling the flow of fuel through said pipes, both said means being removable while said pipes and fitting remain in position and an operating handle for said control means disposed outside said oven.

6. A fuel controller for use on a gas stove having an oven which comprises temperature-responsive means, fuel pipes, a fitting to which said pipes lead, and control means actuated by said temperature-responsive means and controlling flow of fuel through said pipes, said temperature-responsive means, pipes, fitting and control means being disposed inside the oven with the control means removable while said pipes remain in position.

7. A fuel controller for use on a gas stove having an oven which comprises temperature-responsive means and fuel pipes within said oven, a fitting to which said pipes lead, a control device within said oven actuated by said means and controlling the flow of fuel through said pipes, said device being operatively connected to said fitting and removable therefrom as a unit.

8. A fuel controller for use on a gas stove having an oven which comprises temperature-responsive means and fuel pipes within said oven, a fitting to which said pipes are connected, said fitting having separate passages therethrough to which said pipes lead, a control device within said oven actuated by said means and controlling the flow of fuel through said pipes, said device being detachably connected to said fitting and having passages therein corresponding to those in said fitting.

9. A fuel controller for use on a gas stove having an oven which comprises temperature-responsive means and fuel pipes within said oven, a fitting receiving fuel from one pipe and delivering it to another, and a control device within said oven actuated by said means for controlling the flow of fuel through said fitting, said device being removable as a unit while said fitting and pipes remain in position.

10. A fuel controller for use on a gas stove having an oven which comprises fuel pipes within said oven, a fitting to which said pipes are connected, a casing containing a thermostatically operated valve, said casing being disposed inside the oven and operatively and detachably connected to said fitting.

11. A fuel controller for use on a gas stove having an oven which comprises fuel pipes within said oven, a fitting within said oven to which said pipes are connected, and a casing within said oven containing a thermostatically controlled valve for controlling flow of fuel, said casing being operatively connected to said fitting to receive fuel therefrom on one side of said valve and deliver fuel to said fitting from the other side of said valve, said casing being removable as a unit while said fitting and pipes remain in position.

12. In a gas stove having an oven, the combination of a thermostatic valve casing inside the oven, an adjusting handle therefor outside the oven, and a by-pass connection around said valve having adjusting means accessible outside the oven.

13. In a thermostatic controller, the combination of a thermostatic valve casing, a fitting having separate passages therethrough, said fitting being operatively connected to said casing, fuel pipes leading to said fitting, and a controllable connection in said fitting connecting said passages.

14. In a thermostatic controller, the combination of a fitting having a pair of separate passages therethrough, a pair of fuel pipes connected to said fitting leading one to each passage, and a by-pass connection in said fitting between said passages, and connecting means on said fitting separately communicating with said passages beyond the by-pass connection.

15. In a gas stove having an oven, the combination of a thermostatic valve casing, a fitting to which said casing is connected, fuel pipes leading to said fitting, to deliver fuel through the fitting to the casing on one side of the valve and receive fuel through the fitting from the casing on the other side of said valve, and a by-pass connection in said fitting for conducting fuel from one pipe to the other.

16. In a thermostatic controller, the combination of a thermostatic valve casing, a unitary fitting for supplying fuel to the casing on one side of the valve and withdrawing it on the other side of the valve, said fitting being detachably connected to the casing, and a by-pass connection around said valve outside of said casing.

17. In a gas stove having an oven, a thermostatic valve casing inside the oven having an operating handle outside the oven, a fitting within the oven delivering fuel to the casing at one side of the valve and receiving it from said casing at the other side of the valve, a by-pass connection in said fitting around said valve, and means for controlling the by-pass connection accessible outside the oven.

18. In a gas stove having an oven, a fitting inside the oven attached to the oven wall, fuel pipes inside the oven leading to said fitting, and a thermostatic valve casing inside the oven connected to the fitting at a point remote from said wall, said casing being removable from said fitting while the latter remains in position.

19. In a gas stove having an oven, a fitting inside the oven against the oven wall and attached thereto, fuel pipes inside the oven leading to said fitting, a thermostatic valve casing inside the oven connected to the fitting against a face remote from said wall, and an operating handle for the valve outside the oven wall.

20. In a gas stove having an oven, a thermostatic valve casing, thermostatic means attached to said casing and actuating said valve, a fitting connected to said casing, fuel pipes leading to said fitting, said casing, thermostatic means, fitting and pipes being disposed within the oven, and said casing and thermostatic means being removable as a unit while said pipes remain in position.

21. In a gas stove having an oven, a thermostatic valve casing inside the oven, means extending through the oven wall for adjusting the valve, conduit means inside the oven for leading fuel to the casing at one side of the valve and withdrawing from the casing at the other side of the valve, a by-pass connection around the valve, and means extending through the oven wall and accessible outside the oven for regulating flow through said by-pass.

22. In a gas stove having an oven, a thermostatic valve casing inside the oven, a fitting inside the oven secured with one face against the oven wall, said fitting having separate passages therethrough, fuel pipes in the oven leading one to each passage in said fitting, means on said casing and on the face of said fitting remote from the oven wall for leading fuel from one passage to the casing at one side of said valve and from said casing at the other side of said valve to another passage, and means for connecting said casing and fitting together, said casing being removable from said fitting while the latter and said pipes remain in place.

23. In a thermostatic controller, a casing containing a valve, temperature-responsive means attached to the casing wall at one side of said valve, a control element for the valve extending through the casing wall in alignment with said valve and on the side of the valve opposite to that on which said means lies, and an extension from said casing, said extension having a pair of openings lying on the same side of said valve as said control element.

24. A fuel controller for use on a gas stove having an oven which comprises temperature-responsive means, a casing containing a valve actuated by said means, and pipes for delivering fuel to said casing at one side of said valve and leading fuel away from said casing at the other side of said valve, said means, casing and pipes being disposed inside the oven, and said casing being removable while said pipes remain in position.

25. A fuel controller for use on a gas stove having an oven which comprises temperature-responsive means, a casing containing a valve actuated by said means, pipes for delivering fuel to said casing at one side of said valve and leading fuel away from said casing at the other side of said valve, said means, casing and pipes being disposed inside the oven and said casing being removable while said pipes remain in position, and means extending through the oven wall for controlling the operation of said valve.

26. A fuel controller for use on a gas stove having an oven which comprises temperature-responsive means, fuel pipes, a fitting to which the pipes lead, and a casing containing a valve actuated by said means, said means, pipes, fitting and casing being disposed within the oven, and said casing and means being removable as a unit while said pipes and fitting remain in position.

27. A fuel controller for use on a gas stove having an oven which comprises temperature-responsive means, fuel pipes, a fitting to which the pipes lead, a casing containing a valve actuated by said means, a shaft extending through said casing and oven wall and operable to vary the position of the valve within the casing, and a handle removably mounted on the shaft outside the oven wall, said means, pipes, fitting and casing being disposed within the oven, and said casing and means being removable as a unit while said pipes and fitting remain in position.

28. A fuel controller for use on a gas stove having an oven which comprises a rod and tube thermostat, fuel pipes, a control device connected to said thermostat and operated thereby to control the flow of fuel through said pipes, and a fitting to which said pipes lead and to which said device is connected, said thermostat, pipes, device, and fitting being disposed within the oven and said device and thermostat being removable while said pipes and fitting remain in position.

29. A fuel controller for use on a gas stove having an oven which comprises a fitting having gas passages, pipes leading to said fitting and communicating with said passages, a control device connected to the fitting and controlling flow of gas through said passages, a rod and tube thermostat connected to said device and operating it, a handle outside the oven operatively and removably connected through the oven wall to the device to regulate it, said fitting, pipes, device and thermostat being disposed within the oven and said device and thermostat being removable into the interior of the oven while the fitting and pipes remain in position.

30. In a thermostatic controller for use in gas stoves having an oven, the combination of a fitting disposed inside the oven wall and having a pair of separate passages therethrough, a pair of fuel pipes connected to the fitting and leading one to each passage, a by-pass connection in said fitting between said passages, and means having an operating part exposed through an opening in the oven wall for controlling flow through said connection.

31. In a thermostatic controller for use in gas stoves having an oven, the combination of a thermostatic valve casing, means for supplying fuel to the casing at one side of the valve and withdrawing it at the other side of the valve, said casing and means being disposed inside the oven wall, a by-pass connection around said valve, and means operable from outside the oven for controlling flow through said connection.

32. In a thermostatic controller for use in gas stoves having an oven, the combination of a fitting disposed inside the outer wall of the oven and having a pair of separate passages therethrough, a pair of fuel pipes connected to the fitting and leading one to each passage, a by-pass connection in the fitting for permitting flow from one passage to the other, an extension from the fitting projecting through an opening in the oven wall, and means mounted in said extension and operable from outside of the oven for controlling flow through said connection.

33. In a gas stove having an oven, the combination of a casing containing a thermostatically operated valve, a fitting within the oven and communicating with the casing, fuel pipes leading to said fitting, a by-pass connection around said valve, said connection lying within the oven, and a valve having a portion projecting through the oven wall for controlling flow through said connection.

34. A thermostatic controller for use in a gas stove having an oven, which comprises a casing containing a valve, a fitting having passages therethrough, fuel pipes leading separately to the passages in said fitting, said casing, fitting and pipes being disposed within the oven, and said casing and fitting being detachably connected, means in said casing for leading gas from said passages to and from opposite sides of said valve, thermostatic means for operating said valve, and means for securing said fitting and casing together to bring said means into gas-tight relation to said passages.

35. In a thermostatic controller for use in a gas stove having an oven, a casing containing a valve and means for leading gas to and from opposite sides of said valve, a fitting having a pair of gas passages therethrough, fuel pipes leading separately to said passages, means for detachably securing said fitting and casing together with said means communicating with said passages in a gas tight fashion, and thermostatic means for operating said valve, said casing, fitting, pipes and thermostatic means being disposed within said oven with said casing removable while said fitting and pipes remain in place.

36. In a fuel control system, an oven having fuel conducting means concealed therein, heat responsive means within the oven, and a control casing for said heat responsive means also concealed in the oven and having direct detachable connection therein with the fuel conducting means, said casing being bodily removable from within the oven with said fuel conducting means in position.

37. In a fuel control system, an oven, a manifold having two longitudinal passageways therein for the flow of fuel therethrough in opposite directions to and from the control casing, heat responsive means within the oven, and a control casing for the heat responsive means having detachable connection with the upper end of the manifold, the said casing having a valve therein and having two passages provided therein communicating with opposite sides of the valve, the one passage in said casing communicating with the one passage of the manifold, and the other passage of the casing communicating with the other passage of the manifold when the casing is connected therewith.

38. In a fuel control system, an oven, a manifold having two longitudinal passageways therein for the flow of fuel therethrough in opposite directions to and from the control casing, heat responsive means within the oven, a control casing for the heat responsive means, the same having a valve therein and having two passages provided therein communicating with opposite sides of the valve and arranged to be placed in communication with the corresponding passages of the manifold, the upper end of said manifold and the lower end of the control casing being conformed for direct engagement with each other for detachable coupling purposes whereby to place the passages of the manifold and casing in communication with each other, and means for fastening the manifold and casing portions together.

39. In a gas stove having an oven, the combination of temperature-responsive means within the oven, a valve actuated by said means, a casing for said valve disposed inside the oven wall, said casing having passages therein leading to opposite sides of the valve, fuel pipes inside the oven wall for leading fuel to and from the valve casing, a fitting inside the oven wall attached to said pipes and having passages therethrough with which said pipes communicate, said fitting and valve casing being detachably connected with the passages in the fitting communicating with the passages in the casing, said casing and temperature-responsive means being removable while said fitting and pipe remain in place.

40. In a gas stove having an oven, a fuel controller which comprises temperature-responsive means, a valve casing disposed inside the oven wall and containing a fuel control valve actuated by said means, fuel pipes inside the oven wall, and a fitting inside the oven wall to which said pipes lead, said fitting and casing being detachably connected with the casing removable while the fitting and pipes remain in position.

41. In a gas stove having an oven, a fuel controller which comprises temperature-responsive means, a valve casing disposed within the oven wall and containing a fuel-control valve actuated by said means, fuel pipes within the oven wall, a fitting within the oven wall to which said pipes lead, said fitting and casing having overlapping parts and passages for connecting one pipe with the casing at one side of the valve and the other pipe with the casing at the other side of the valve, and means for securing said fitting and casing together, said means permitting detachment and removal of said casing while the fitting and pipes remain in position.

In testimony whereof I affix my signature.

EDWARD L. FONSECA.